US009656682B2

(12) United States Patent
Ahlemeier

(10) Patent No.: US 9,656,682 B2
(45) Date of Patent: May 23, 2017

(54) MOTORIZED STROLLER SYSTEM AND APPARATUS

(71) Applicant: Eli Ahlemeier, Richardson, TX (US)

(72) Inventor: Eli Ahlemeier, Richardson, TX (US)

( * ) Notice: Subject to any disclaimer, the term of this patent is extended or adjusted under 35 U.S.C. 154(b) by 0 days.

(21) Appl. No.: 14/511,488

(22) Filed: Oct. 10, 2014

(65) Prior Publication Data

US 2016/0101803 A1    Apr. 14, 2016

(51) Int. Cl.
*B62B 7/04*    (2006.01)
*B62B 9/08*    (2006.01)
*B62B 9/00*    (2006.01)
*B62B 5/00*    (2006.01)

(52) U.S. Cl.
CPC .................. *B62B 9/08* (2013.01); *B62B 9/00* (2013.01); *B62B 5/0033* (2013.01); *B62B 5/0069* (2013.01); *B62B 7/042* (2013.01)

(58) Field of Classification Search
CPC  B62B 9/08; B62B 9/00; B62B 5/0033; B62B 5/0036; B62B 5/004; B62B 5/0043; B60L 2200/20
See application file for complete search history.

(56) References Cited

U.S. PATENT DOCUMENTS

| | | | | |
|---|---|---|---|---|
| 4,776,415 A * | 10/1988 | Brice | ................... | A47D 13/043 180/11 |
| 5,873,425 A * | 2/1999 | Yang | ........................ | B62B 9/00 180/216 |
| 5,937,961 A * | 8/1999 | Davidson | .................. | B62B 9/00 180/166 |
| 6,027,137 A * | 2/2000 | Rura | ........................ | A47C 7/66 261/DIG. 3 |
| 6,148,942 A * | 11/2000 | Mackert, Sr. | ............. | B62B 9/08 180/65.6 |
| 6,378,883 B1 * | 4/2002 | Epstein | ..................... | A61G 5/04 180/6.5 |
| 6,393,348 B1 * | 5/2002 | Ziegler | .................. | B60N 2/002 180/271 |
| 6,409,206 B1 * | 6/2002 | Willrich | .................... | B62B 9/00 261/DIG. 3 |
| 6,527,673 B1 * | 3/2003 | Chen | ......................... | B62B 9/00 135/67 |
| 6,530,591 B2 * | 3/2003 | Huang | .................... | B62B 7/123 280/47.38 |

(Continued)

*Primary Examiner* — J. Allen Shriver, II
*Assistant Examiner* — Travis Coolman
(74) *Attorney, Agent, or Firm* — Baker Botts L.L.P.

(57) ABSTRACT

In certain embodiments, a stroller system includes a stroller frame connected to three or more wheels, a housing unit operable to accommodate a rider, a motor coupled to the frame and to at least one of the wheels, and a brake coupled to at least one of the wheels. The system further includes one or more processors coupled to the frame, a first electronic display coupled to the frame and communicatively coupled to at least one of the one or more processors, and sensors coupled to the frame and to at least one processor. A distance sensor measures a distance between the distance sensor and an object, and a speed sensor measures the speed of the frame. The one or more processors are operable to receive measurements from the distance sensor and speed sensor, and to determine, based on the received measurements, whether to apply the brake.

20 Claims, 1 Drawing Sheet

(56) References Cited

U.S. PATENT DOCUMENTS

| | | | | |
|---|---|---|---|---|
| 6,663,121 B2* | 12/2003 | Santos | B62B 7/04 | 280/47.38 |
| 6,696,943 B1* | 2/2004 | Elrod | B60N 2/0224 | 340/539.1 |
| 6,809,643 B1* | 10/2004 | Elrod | A61B 5/02055 | 180/271 |
| 7,360,421 B2* | 4/2008 | Weber | B62J 99/00 | 324/160 |
| 7,487,978 B2* | 2/2009 | Tutmaz | B62B 9/26 | 224/409 |
| 7,490,684 B2* | 2/2009 | Seymour | B60L 8/003 | 180/65.1 |
| 7,987,933 B1* | 8/2011 | McClellan | B60K 1/00 | 180/65.1 |
| 8,033,348 B1* | 10/2011 | Parkhe | B62B 9/00 | 180/19.1 |
| 8,118,313 B2* | 2/2012 | Lee | A63G 19/10 | 280/1.13 |
| 8,256,793 B1* | 9/2012 | Krieger | A63H 33/006 | 280/647 |
| 8,479,961 B2* | 7/2013 | Schneidau | B60R 11/02 | 224/409 |
| 8,500,143 B2* | 8/2013 | Yu | A61H 3/04 | 180/19.3 |
| 8,789,638 B2* | 7/2014 | Zhang | G05D 1/0255 | 180/167 |
| 8,991,838 B2* | 3/2015 | Li | B62B 9/20 | 280/47.38 |
| 9,144,708 B2* | 9/2015 | Selek | A63B 23/16 | |
| 2002/0167140 A1* | 11/2002 | Pike | A63B 24/00 | 280/47.38 |
| 2003/0132612 A1* | 7/2003 | Pike | A63B 24/00 | 280/642 |
| 2006/0098961 A1* | 5/2006 | Seutter | A47K 10/48 | 392/383 |
| 2007/0080519 A1* | 4/2007 | Murdock | A61G 5/00 | 280/650 |
| 2008/0042384 A1* | 2/2008 | Ferraioli | B62B 9/26 | 280/47.38 |
| 2008/0084040 A1* | 4/2008 | McGowan | B62B 9/00 | 280/47.38 |
| 2009/0179394 A1* | 7/2009 | Huber | B62B 3/144 | 280/47.38 |
| 2009/0289431 A1* | 11/2009 | Geeslin | B62B 9/085 | 280/47.38 |
| 2010/0066044 A1* | 3/2010 | Kim | B62B 7/04 | 280/47.11 |
| 2012/0086187 A1* | 4/2012 | Daley | B62B 7/062 | 280/642 |
| 2013/0001927 A1* | 1/2013 | Mellinger | B62B 9/26 | 280/647 |
| 2013/0162396 A1* | 6/2013 | Yang | B60L 15/20 | 340/5.81 |
| 2013/0249202 A1* | 9/2013 | White | B62B 9/26 | 280/769 |
| 2014/0144346 A1* | 5/2014 | Houston | B62B 9/22 | 105/50 |
| 2014/0159346 A1* | 6/2014 | Laffan | B62B 7/008 | 280/650 |
| 2014/0346746 A1* | 11/2014 | Li | B62B 9/085 | 280/47.38 |
| 2014/0346756 A1* | 11/2014 | Laffan | B62B 9/26 | 280/648 |
| 2015/0061249 A1* | 3/2015 | Diaz | B62B 9/28 | 280/47.35 |
| 2015/0066278 A1* | 3/2015 | Katayama | B62B 5/0069 | 701/22 |
| 2015/0069727 A1* | 3/2015 | Lee | B62B 9/08 | 280/47.38 |
| 2015/0144411 A1* | 5/2015 | Washington | B62B 5/0076 | 180/167 |

* cited by examiner

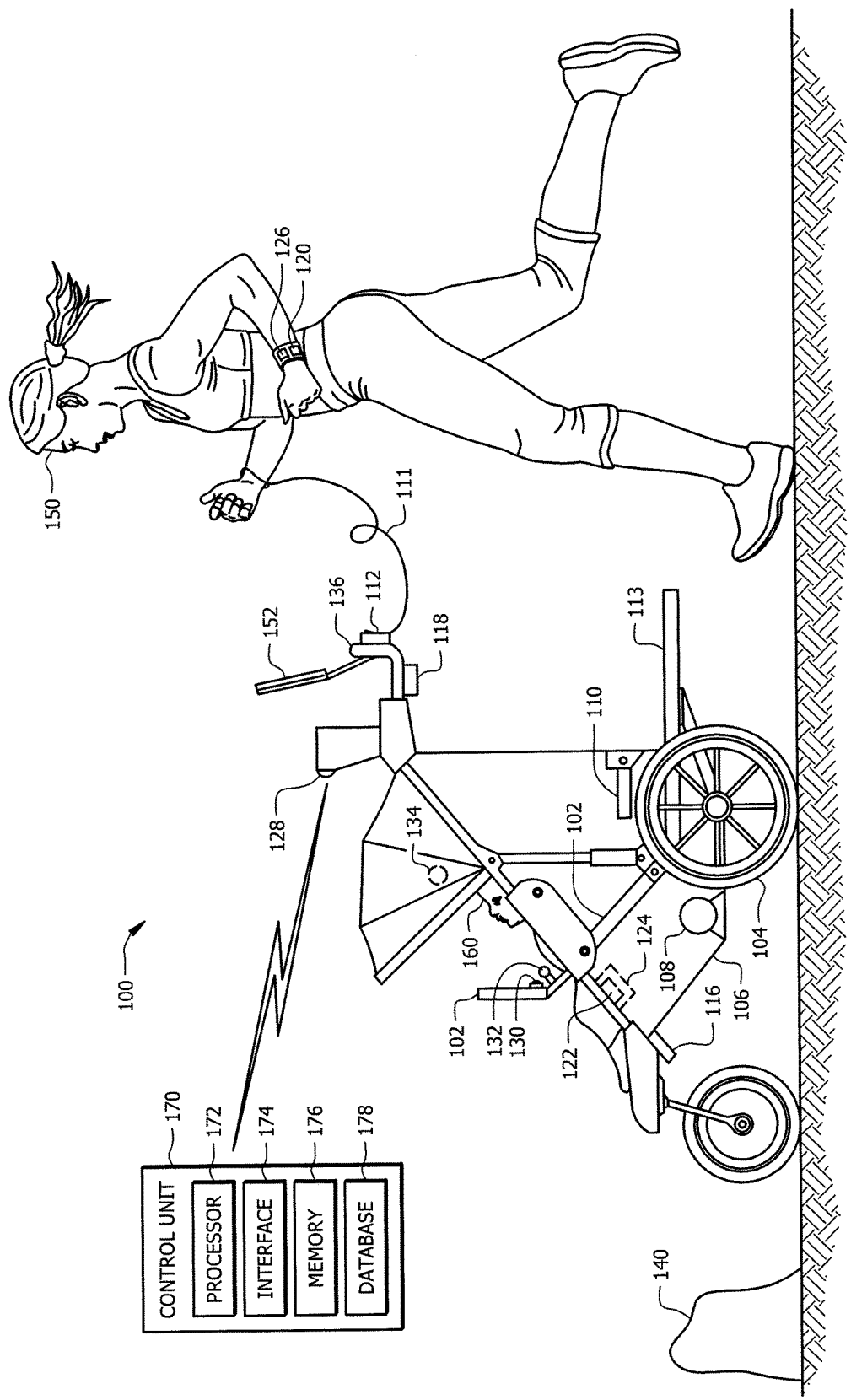

MOTORIZED STROLLER SYSTEM AND APPARATUS

TECHNICAL FIELD

This invention relates generally to motorized vehicles and more particularly to a motorized stroller.

BACKGROUND

Strollers provide a mode of transportation for children so that parents can exercise or otherwise move about while keeping their children nearby. Current stroller designs may require the operator to manually push the stroller while walking or running. Additionally, existing strollers often do not provide for suitable communication between an operator and a rider.

SUMMARY OF EXAMPLE EMBODIMENTS

According to embodiments of the present disclosure, disadvantages and problems associated with previous stroller systems may be reduced or eliminated.

In certain embodiments, a motorized stroller system includes a stroller frame connected to three or more wheels, a housing unit operable to accommodate a first rider, a motor coupled to the frame and to at least one of the wheels, a brake coupled to at least one of the wheels, one or more processors coupled to the frame, and an electronic display coupled to the frame and communicatively coupled to at least one of the one or more processors. The system also includes a distance sensor coupled to the frame and communicatively coupled to at least one of the one or more processors. The distance sensor is operable to measure a distance between the sensor and an object. The system further includes a speed sensor coupled to the frame and communicatively coupled to at least one of the one or more processors. The motorized stroller system's one or more processors are operable to receive a distance measurement from the distance sensor, receive a speed measurement from the speed sensor, and determine, based at least in part on the received distance measurement and the received speed measurement, whether to apply the brake.

Certain embodiments of the present disclosure may provide one or more technical advantages. A technical advantage of the present disclosure is that the motorized stroller system may include a safety line with an operator connection and a stroller connection and a safety sensor with a control unit that measures the force exerted on the stroller connection. The control unit may communicate with the motor to slow the stroller down in the event the safety line detaches from the stroller connection. In some instances, motorized stroller system includes a temperature control system that regulates the temperature of air in the housing unit. Another technical advantage is that the motorized stroller system may include a running program that can measure the distance traveled by the stroller frame. In some embodiments, the motorized stroller system includes a flare connected to the stroller frame. The flare may ignite in extenuating circumstances, such as when a motorized vehicle comes within a certain distance of the stroller.

A further technical advantage of motorized stroller system is that it may include a camera connected to the stroller frame and operable to record real-time images of the rider in the housing unit. The camera may generate a signal to the operator's electronic display to provide the operator with a constant visual of the rider. In some instances, motorized stroller system includes audio receivers connected to the stroller frame that broadcast audio signals to the operator and rider so that the operator and rider may orally communicate with one another. Additionally, motorized stroller system may include one or more housing units connected to the stroller frame that enable the operator to transport one or more additional children.

Other technical advantages of the present disclosure will be readily apparent to one skilled in the art from the following FIGURE, descriptions, and claims. Moreover, while specific advantages have been enumerated above, various embodiments may include all, some, or none of the enumerated advantages.

BRIEF DESCRIPTION OF THE DRAWINGS

To provide a more complete understanding of the present invention and the features and advantages thereof, reference is made to the following description taken in conjunction with the accompanying drawing, in which:

FIG. 1 illustrates an example motorized stroller system and apparatus according to certain embodiments of the present disclosure.

DETAILED DESCRIPTION

Embodiments of the present invention and its advantages are best understood by referring to FIG. 1 of the drawing, like numerals being used for like and corresponding parts of the drawing.

Stroller operators must manually push the stroller frame while exercising or moving about to propel the stroller forward. Stroller systems, particularly those used for jogging, tend to be heavy, and the energy required to push the stroller, especially a stroller accompanying a child, can cause undue fatigue and weariness. In addition, pushing a stroller often leads to poor posture, which over time can lead to pain, discomfort, and injury. Moreover, jogging while pushing a stroller may cause the operator's stride to impact the stroller or may force the operator to reduce their stride length to avoid impacting the stroller.

In certain embodiments, a motorized stroller system includes a stroller frame, one or more housing units connected to the stroller frame, three or more wheels, one or more sensors connected to the stroller frame and/or housing units, a temperature control system for the housing unit, a running program operable to measure the distance traveled by the stroller frame, and one or more devices coupled to the stroller frame or housing unit, such as a flare, a camera, a speaker system, or a step.

FIG. 1 illustrates an example motorized stroller system 100 according to certain embodiments of the present disclosure. In an embodiment, system 100 includes stroller frame 102, three or more wheels 104, one or more housing units 106 connected to frame 102, motor 108, one or more brakes 110, one or more processors 172, and one or more devices coupled to stroller frame 102 or housing unit 106, such as user electronic display 152, rider electronic display 162, distance sensor 116, speed sensor 118, temperature control system 124 for housing unit 106, heart rate sensor 126, flare 128, camera 130, audio receiver 132, speaker 134, and step 113.

Frame 102 represents a structure operable to accommodate rider 160 and one or more components of system 100. Frame 102 may be comprised of any suitable material, such as steel, aluminum, plastic, fiberglass, or a combination thereof. In some embodiments, frame 102 includes rods, hinges, axles, hand grip bar or handles 136, and a support for an underneath storage compartment. Hand grip bar or handles 136 are adjustable to accommodate the height of operator 150 in some instances.

Further, in some examples, hand grip bar or handles 136 may support a console or a drink holder.

In some embodiments, frame 102 may be folded for compactness. For example, operator 150 may retract or expand frame 102 by pushing a release button or by turning a handle or a hand grip bar to release hinged connections. In some instances, a locking mechanism may secure frame 102 in either its compacted or expanded position. One purpose of the locking mechanism is to prevent the stroller from accidentally closing when in use.

Wheel 104 represents a component coupled to frame 102 that rotates about one or more axes. Wheel 104 is generally circular in shape but can be any shape or size. Frame 102 may be supported by three or more wheels 104. For example, eight wheels 104 may support frame 102 to improve maneuverability over uneven or rough surfaces. In some embodiments, wheel 104 includes a rim, a hub, and spokes. Further, wheel 104 may include a suspension system to allow relative motion between the stroller's frame and the wheel. For example, the suspension system may allow one wheel to move independently from the other wheels. The suspension system helps absorb vibration and shock from the surface, thus contributing to the handling of operator 150 and the comfort of rider 160. Further, in some embodiments, one or more wheels 104 swivel for improved maneuverability. In some particular embodiments, one or more wheels 104 lock to impede rotation and thus provide better stability. In some instances, only the back wheels are locked, allowing the front wheels 104 to swivel. Wheels 104 may be comprised of any suitable material, such as rubber or plastic.

Housing unit 106 represents a structure operable to accommodate one or more riders 160. In some embodiments, frame 102 accommodates housing unit 106 in a forward-facing direction. In some specific embodiments, frame 102 may adjust to accommodate forward-facing housing unit 106 in one or more reclined positions. Additionally, frame 102 may accommodate housing unit 106 in a rear-facing direction, and in some particular instances frame 102 may adjust to accommodate rear-facing housing unit 106 in one or more reclined positions. In other embodiments, housing 106 comprises a reversible seat, and frame 102 accommodates the reversible seat in both the forward-facing and rear-facing directions. Further, frame 102 may accommodate more than one housing unit 106.

In some instances, housing unit 106 comprises an independent transport device that can be removed from frame 102, such as a car seat. For example, frame 102 may provide snaps, buttons, Velcro®, or some other mechanism to secure the removable housing unit in place. In some instances, frame 102 may support the removable housing unit in either a rear-facing or forward-facing direction. Additionally, frame 102 may support more than one removable housing unit.

Housing unit 106 may consist of any suitable material, for example, one or more of plastic, rubber, fabric, or nylon. In some embodiments, housing unit 106 is adjustable to accommodate riders of different sizes (e.g., infant, toddler, etc.). For instance, housing unit 106 may be comprised of components operable to expand to different sizes (e.g., fabric, Velcro®, snaps, buttons), modular components that support adding or removing portions of housing unit 106 to increase or decrease the size (e.g., expanded polystyrene foam), or other structure or material that allows housing 106 to dynamically increase or decrease in size (e.g., viscoelastic polyurethane foam).

In certain embodiments, housing 106 may comprise one or more different materials. For example, all or a portion of the housing unit 106 may comprise a structurally solid material (e.g., plastic, fiberglass, metal). Additionally, all or a portion of housing unit 106 may be comprised of a flexible material (e.g. fabric). In some embodiments, housing unit 106 includes a combination of two or more of the aforementioned materials. Different riders may benefit from different configurations. For example, small riders such as infants that require extra support may benefit from a structurally solid housing unit encased in fabric, whereas larger riders such as toddlers may benefit from an all-fabric housing unit that allows for more movement. Further, housing unit 106 may include an adjustable 3-point or 5-point harness to secure the child to housing unit 106. In some examples, the harness includes nylon straps, plastic buckles, and metal clips.

In some embodiments, housing unit 106 is an enclosure. The enclosure may be adjustable by a zippers, snaps, or any other suitable fasteners. In some particular embodiments, the material covering the enclosure is transparent to provide rider 160 visibility to the outside environment. Additionally, the material covering the enclosure may be opaque (e.g., cloth, flexible plastic, etc.). In other embodiments, housing unit 106 is open to the environment. Housing unit 106 may include a sun visor or a shade to shield rider 160 from ultraviolet (UV) rays. Further, housing unit may be comprised of waterproof or water resistant materials.

Motor 108 represents a power unit operable to impart motion to stroller frame 102. Motor 108 may be coupled to frame 102 and/or to one or more wheels 104. In some embodiments, motor 108 is an electric motor. In some particular embodiments, motor 108 is a DC electric motor powered by one or more batteries. Motor 108 may power only the rear wheels of motorized stroller system 100 in some instances, reserving the front wheels for steering. Additionally, motor 108 may power only the front wheels of motorized stroller system 100. In another embodiment, motor 108 powers both the rear and front wheels, or a combination thereof.

Brake 110 represents an apparatus configurable to slow, stop, or park the stroller. In some embodiments, brake 110 applies force directly to one or more wheels 104 to slow frame 102. For example, brake 110 may comprise a lever that presses a friction plate against one or more rear wheels 104. In another embodiment, brake 110 functions by decreasing power to motor 108, thus allowing frame 102 to decelerate. Some embodiments of motorized stroller system 100 include a safety brake that automatically or manually slows or stops wheels 104 in the event operator 150 separates more than a specified distance, for example three feet, from frame 102. Motorized stroller system 100 may also include a parking brake that prevents wheels 104 from rotating, thus securing frame 102 in a stopped position.

Electronic display 152 represents a device operable to present information to at least operator 150. Electronic display 152 may be coupled to frame 102 and communicatively coupled to at least one of the one or more processors 172. In some instances, electronic display 152 presents information such as time, speed, route, map, distance traveled, calories burned, the song playing, and/or a video of rider 160 in the stroller. For example, electronic display 152 may show operator 150 a video of rider 160 in real time to assure operator 150 that rider 160 is safe. In some embodiments, display 152 is located on the hand grip bar or handles. Electronic display 152 may also be positioned on an operator console or on any other suitable part of frame 102. In some embodiments, electronic display 152 is a screen, such as an LED, LCD, or plasma screen. In some particular instances, the electronic display screen may be curved.

Similarly, electronic display 162 represents a device operable to display information to at least rider 160. Electronic display 162 may be coupled to frame 102 and communicatively coupled to at least one of the one or more processors 172. In some instances, electronic display 162 presents information such as time, speed, route, map, distance traveled, calories burned, the song playing, and/or a video of operator 150. For example, electronic display 162 may show rider 160 a video of operator 150 in real time to comfort rider 160. In some embodiments, electronic display 162 is positioned on a rider console or on any other suitable part of frame 102. In some embodiments, electronic display 162 is a screen, such as an LED, LCD, or plasma screen. In some particular instances, the display screen may be curved.

Distance sensor 116 represents a device operable to detect the presence of objects 140 within a specified range of the sensor. For instance, distance sensor 116 may emit an electromagnetic radiation beam (e.g., infrared) or an electromagnetic field to detect the presence of nearby objects 140. Distance sensor 116 may couple to frame 102, wheels 104, and/or housing unit 106. In certain embodiments, distance sensor 116 can determine the distance between frame 102 and object 140 obstructing the path of the stroller, such as a boulder. Further, in some embodiments distance sensor 116 can determine the distance between frame 102 and a moving object, such as a bicycle or a motorized vehicle, and sound an alarm when distance between rider 160 and object 140 is less than a specified length, such as five feet. In some instances, distance sensor 116 detects the curvature in the path and/or traffic. Distance sensor 116 may include a communication port (e.g., USB port) communicatively coupled to one or more of frame 102, wheel 104, housing unit 106, motor 108, or brake 110.

In some embodiments, distance sensor 116 may generate a command to change the speed of motorized stroller system 100. For instance, distance sensor 116 may send a command to motor 108 to slow frame 102 when the stroller comes within a specified threshold of object 140. In some specific embodiments, the distance threshold may vary depending on the target object. For example, object 140 such as a butterfly may have no distance threshold, allowing the stroller to come into contact with the butterfly without altering the stroller's speed. However, a larger object may have a larger distance threshold. For example, if frame 102 comes within three meters of a wall, distance sensor 116 may send a response to motor 108 to slow frame 102. Further, distance sensor 116 may be operable to sound an alarm when object 140 enters a specified threshold.

Speed sensor 118 represents a device operable to measure the speed of frame 102. In a particular embodiment, speed sensor 118 may determine the speed of frame 102 by using the rate of rotation of one or more wheels 104. Additionally, speed sensor 118 may determine the speed of frame 102 by communicating with a Global Positioning System (GPS) device. Speed sensor 118 may couple to frame 102, wheels 104, and/or housing unit 106. Further, speed sensor 118 may include a communication port (e.g., USB port) communicatively coupled to one or more of frame 102, wheel 104, housing unit 106, motor 108, or brake 110.

Pressure sensor 120 represents a device operable to measure pressure from operator 150. Pressure sensor 120 may be coupled to stroller frame 102 (e.g., hand grip bar) or to a hand-held device (e.g. remote control device). In other examples, pressure sensor 120 may be coupled to an article of clothing (e.g., shirt, wristband) of operator 150. In some embodiments, changes in pressure detected by sensor 120 operate to change the direction of motorized stroller system 100. For example, operator 150 may apply pressure to a button on a hand-held device to turn wheels 104.

Temperature control sensor 122 represents a device operable to measure the temperature of an object (e.g., housing unit 106). For example, temperature control sensor 122 may monitor the temperature of housing unit 106 until the ambient temperature of housing unit 106 equals the preset temperature. In some embodiments, temperature control sensor 122 is preset by operator 150 before using stroller system 100. Additionally, temperature control sensor 122 may be adjusted by operator 150 while stroller system 100 is in use. Further, temperature control sensor 122 may be permanently set to a specified temperature. Temperature control sensor 122 may be coupled to housing unit 106, frame 102, or on any other suitable part of stroller system 100.

In some embodiments, housing unit 106 includes a temperature control system 124 operable to regulate the temperature of air in the housing unit. Temperature control system may include a temperature control sensor 122, a heater operable to emit hot air into housing unit 106, and/or a cooler operable to emit cool air into housing unit 106. In some instances, temperature control sensor 122 may communicate with temperature control system 124 to shut off the heater if the temperature falls within a certain range, for example above 78 degrees Fahrenheit. Similarly, temperature control sensor 122 may communicate with temperature control system 124 to shut off the cooler if the temperature falls within a certain range, for example below 70 degrees Fahrenheit.

Heart rate sensor 126 represents a device operable to measure the heart rate of an operator 150 or rider 160. In some embodiments, heart rate sensor 126 is coupled to frame 102 or a hand-held device and reads the heart rate of operator 150 when operator 150 makes contact with the sensors. In some instances, heart rate sensor 122 may include a control that adjusts the intensity of the workout of operator 150 based on the heart rate of operator 150, for example adjusting the speed of motorized stroller system 100.

Sensors are not limited to the aforementioned sensors and may measure other variables such as position, motion, connectivity, moisture, various wavelengths of light (e.g., infrared, visible, and/or ultraviolet), various wavelengths of sound (e.g., ultrasonic and or infrasonic), particle concentration (e.g., contaminants in air), or any other measurement suitable for motorized stroller system 100.

Flare 128 represents a device operable to send a warning signal to other persons, alerting them of the stroller's presence. In some embodiments, motorized stroller system 100 may include one or more flares 128 coupled to frame 102 and operable to ignite under extenuating circumstances. For example, flares may automatically ignite if object 140, such as a motorized vehicle, comes within a specified threshold distance, as determined by distance sensor 116. In some instances, operator 150 may ignite one or more flares to send an emergency signal.

Camera 130 represents a device operable to record images and may be coupled to stroller frame 102, operator console, and/or rider console. In an embodiment, camera 130 is operable to record an image of rider 160, generate a signal of the image of rider 160, and transmit the signal to electronic display 152. Additionally, camera 130 may be operable to record an image of operator 150, generate a signal of the image of operator 150, and transmit the signal to display 152. The image generated by camera 130 may be still or real-time. In some instances, camera 130 is a digital camera with features such as an optical zoom, digital zoom, and face recognition.

Audio receiver 132 represents an electronic device operable to receive audio signals and convert the signals into a usable form. Speaker 134 represents an electronic device operable to produce sound from an electronic signal. Motorized stroller system 100 may include one or more audio receivers 132 and one or more speakers 134 to facilitate communication between operator 150 and rider 160. For example, audio receiver 132 may receive an audio signal from rider 160, and speaker 134 may broadcast the audio signal to operator 150. Similarly, audio receiver 132 may receive an audio signal from operator 150 and a speaker 134 may broadcast the audio signal to rider 160. The one or more audio receivers 132 and the one or more speakers 134 may be coupled to stroller frame 102, housing unit 106, or any other suitable component of stroller system 100.

Step 113 represents a device connected to stroller frame 102 and operable to support the weight of operator 150. In some embodiments, step 113 may provide a support for operator 150 to rest a leg on top of (e.g., for stretching) while stroller system 100 is not in motion. In some embodiments, operator 150 may climb onto step 113 such that one or more feet of operator 150 no longer touch the ground. This may allow operator 150 to take a break from the current walk or run without requiring stroller system 100 to stop any movement or travel. In some embodiments, step 113 may be connected to stroller frame 102 on the same side as hand grip bar 136, such that it is present on the side of frame 102 on which operator 150 may primarily be. Step 113 may include a hinge and a clasp, such that it may be folded and clasped to frame 102. This may ensure that it does not extend into the stride of operator 150 while stroller system 100 is in motion and operator 150 is walking and/or running behind stroller system 100.

In certain embodiments, one or more components of system 100 (e.g., motor 108, brake 110, electronic operator display 152, electronic rider display 162, distance sensor 116, speed sensor 118, temperature control system 124, heart rate sensor 126, flare 128, camera 130, audio receiver 132, speaker 134, operator display 152, rider display 162, or any other suitable component) may communicate (via wireless or wireline communication) with one or more control units 170. Control unit 170 may include one or more computer systems at one or more locations. Control unit 170 may include any suitable combination of software, firmware, or hardware. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Control unit 170 may include one or more processors 172, interfaces 174, memories 176, and/or databases 178. Processor 172 represents any computing device configured to control the operation of one or more components of motorized stroller system 100. Processor 172 may be a programmable logic device, a microcontroller, a microprocessor, or any suitable combination of the preceding. Processor 172 includes any hardware or software that operates to control and process information received by a component of motorized stroller system 100, such as input and output devices, mass storage media, or any other components suitable for receiving, processing, storing, or communicating data. In certain embodiments, processor 172 communicatively couples to other components of system 100, such as electronic display 152, a module (e.g., control module), an interface, a memory, a database, or any other suitable component.

Interface 174 represents any device operable to receive input, send output, process the input or output, or perform other suitable operations for a component of system 100. Interface 174 includes any port or connection, real or virtual, including any suitable hardware or software, including protocol conversion and data processing capabilities, to communicate through a network. In certain embodiments, interface 174 includes a user interface (e.g., physical input, graphical user interface, touchscreen, buttons, switches, transducer, or any other suitable method to receive input from a user).

Memory 176 represents any device operable to store, either permanently or temporarily, data, operational software, or other information for a processor. Memory 176 includes any one or a combination of volatile or non-volatile local or remote devices suitable for storing information. For example, memory 176 may include random access memory (RAM), read only memory (ROM), magnetic storage devices, optical storage devices, semiconductor storage devices, or any other suitable information storage device or a combination of these devices. Memory 176 may include any suitable information for use in the operation of component of motorized stroller system 100. Memory 176 may further include some or all of one or more databases 178.

Logic may perform the operation of any component of motorized stroller system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

Components of system 100 (e.g., motor 108, brake 110, electronic operator display 152, electronic rider display 162, distance sensor 116, speed sensor 118, temperature control system 124, heart rate sensor 126, flare 128, camera 130, audio receiver 132, speaker 134, and running program) may communicate over one or more networks. In certain embodiments, a network includes any interconnecting system capable of transmitting audio, video, electrical signals, optical signals, data, messages, or any combination of the preceding. A network may include all or a portion of a public switched telephone network (PSTN), a public or private network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of motorized stroller system 100. A network may utilize any suitable communication protocol operable to support communication of one or more motors 108, brakes 110, electronic displays 152, distance sensors 116, speed sensors 118, temperature control systems 124, heart rate sensors 126, flares 128, cameras 130, audio receivers 132, speakers 134, and/or running programs with one or more control modules, including Ethernet over a local area network (LAN), Bluetooth, and IEEE 802.11.

In some embodiments, control unit 170 determines whether to apply brake 110 based on a received distance measurement and a received speed measurement. Distance sensor 116 may determine the distance between object 140 and distance sensor 116. Object 140 may be a boulder, another stroller, a wall, a light post, or any obstruction that may cause harm if stroller system 100 becomes too close or even hits object 140. For example, distance sensor 116 may determine that it is 10 feet away from object 140. Distance sensor 116 may transmit the measured distance to control unit 170. Speed sensor 118 may measure the speed of frame 102. For example, speed sensor 118 may determine the frame 102 is moving at 3 miles per hour. Speed sensor 118 may transmit the measured speed of frame 102 to control unit 170. Control unit 170 may determine whether to apply brake 110 based on the distance measurement and speed measurement transmitted by distance sensor 116 and speed sensor 118, respectively. Control unit 170 may have thresholds for each measurement that must be exceeded before determining to apply brake 110. For example, if frame 102 is within 10 feet of object 140 and frame 102 exceeds 2.5 miles per hour, control unit 170 may determine to apply brake 110. As another example, if frame 102 is within 2 feet of object 140 and frame 102 has a current speed of 0 miles per hour, control unit 170 may determine not to apply brake 110. By basing the determination on the distance measurement and/or speed measurement, control unit 170 determines to apply brake 110 in situations where object 140 may pose a threat to stroller system 100.

In some embodiments, control unit 170 determines to apply brake 110 based at least in part upon the determination that safety line 111 engaged switch 112, the speed measurement, and a maximum deceleration rate. Operator 150 may attach safety line 111 to the clothing of operator 150 or may hold safety line 111 in the hand of operator 150. Operator 150 may move at slower speed than stroller system 100 and, at a certain distance away from stroller system 100, safety line 111 may engage switch 112. If switch 112 is or has been engaged, control unit 170 may determine to apply brake 110. In certain embodiments, control unit 170 may want to ensure stroller system 100 does not come to an abrupt stop, but rather gradually slows down and stops. Control unit 170 may assess the speed of frame 102 (as determined by speed sensor 118) and, based on a maximum deceleration rate (e.g., one based on speed and determined to be a comfortable rate), apply brake 110 such that stroller system 100 slows down and/or stops moving.

In some embodiments, operator 150 uses pressure sensor 120 to change the direction of movement of stroller system 100. Operator 150 may vary the pressure applied to pressure sensor 120 (e.g., by the hand or finger(s) of operator 150) to communicate to change the direction of stroller system 100. For example, operator 150 may press on the right side of pressure sensor 120 to indicate that stroller system 100 should veer to the right. In response to the pressure on the right side of pressure sensor 120, one or more wheels 104 may turn such that stroller system 100 veers to the right of its current direction. In some embodiments, how far in one direction the wheels turn may depend upon the intensity of the pressure, the length of time the pressure is applied, and/or the amount of individual presses operator 150 applies to pressure sensor 120. By using pressure sensor 120 to change the direction of stroller system 100, operator 150 may limit the amount of energy used to steer and turn stroller system 100, thus limiting cause undue fatigue and weariness.

In some embodiments, control unit 170 may ignite flare 128 to send a warning signal to other persons, alerting them of presence of stroller system 100. Control unit 170 may receive a distance measurement from distance sensor 116. For example, if stroller system 100 ends up in the middle of a road, distance sensor 116 may determine object 140 (e.g., a car, bicycle, truck, runner) is within a certain distance (e.g., 10 feet) of stroller system 100. Continuing the example, control unit 170 may determine object 140 is a high-risk object and ignite flare 128. Control unit 170 may ensure that flare 128 ignites in a direction opposite from stroller system 100 and object 140 such that flare 128 will not hit either. The ignition of flare 128 alerts other people (e.g., the driver of a car, a cyclist, a truck driver, a runner) of the presence of stroller system 100. Flare 128 serves as a safety mechanism so that other people may ensure they do not hit stroller system 100 with object 140 (e.g., car). Control unit 170 may ignite flare 128 in addition to applying other safety mechanisms, such as applying brake 110 and/or changing the direction of stroller system 100.

In some embodiments, control unit 170 may present information to operator 150 regarding the workout of operator 150. In one embodiment, heart rate sensor 126 may determine the heart rate of operator 150 and control unit 170 may present the heart rate measurement to operator 150 on operator display 152. This may be beneficial so that operator 150 is aware of the heart rate of operator 150, for example, if operator 150 is working out and wants the heart rate to be within a certain range. In one embodiment, control unit 170 may determine a distance traveled by stroller system 100 and present the determined distance on operator display 152. Control unit 170 may determine the distance traveled based on the rate of rotation of one or more wheels 104 and/or by communicating with a Global Positioning System (GPS) device. This presentation of the distance traveled may be beneficial to operator 150, for example, if operator 150 has a goal mileage to travel within a certain time frame (e.g., a day, a week, a month, a current run and/or walk). By presenting heart rate and distance traveled information to operator 150, stroller system 100 ensures that operator 150 meets any exercise or fitness goals while transporting rider 160.

Although a particular implementation of system 100 is illustrated and primarily described, the present disclosure contemplates any suitable implementation of system 100, according to particular needs. Moreover, although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

Although the present disclosure has been described with several embodiments, diverse changes, substitutions, variations, alterations, additions, omissions, and other modifications may be suggested to one skilled in the art, and it is intended that the disclosure encompass all such changes, substitutions, variations, alterations, additions, omissions, and other modifications as fall within the spirit and scope of the appended claims.

What is claimed is:

1. A motorized stroller system, comprising:
   a stroller frame connected to three or more wheels;
   a housing operable to accommodate a first rider;

a motor coupled to the frame and at least one of the wheels operable to apply power to the at least one of the wheels;
a brake coupled to at least one of the wheels;
one or more processors coupled to the frame;
a distance sensor coupled to the frame and communicatively coupled to at least one of the one or more processors, the distance sensor operable to measure a distance between the sensor and an object;
a speed sensor coupled to the frame and communicatively coupled to at least one of the one or more processors, the speed sensor operable to measure the speed of the frame;
a switch operable to apply the brake;
a safety line coupled to the switch;
a steering structure operable to change a direction of movement of the stroller frame;
a temperature sensor coupled to the housing unit and communicatively coupled to at least one of the one or more processors, the temperature sensor operable to measure an air temperature in the housing unit;
a heating element coupled to the housing unit and communicatively coupled to at least one of the one or more processors, the heating element operable to emit hot air into the housing unit;
a cooling element coupled to the housing unit and communicatively coupled to at least one of the one or more processors, the cooling element operable to emit cool air into the housing unit;
a heart rate sensor communicatively coupled to at least one of the one or more processors and operable to measure a heartbeat of an operator;
a first camera connected to the stroller frame and communicatively coupled to at least one of the one or more processors, the first camera operable to record the interior of the housing unit;
a second camera connected to the stroller frame and communicatively coupled to at least one of the one or more processors operable to record the operator;
a first electronic display coupled to the frame and communicatively coupled to at least one of the one or more processors, the first electronic display operable to present the recorded interior of the housing unit from the first camera;
a second electronic display coupled to the frame and communicatively coupled to at least one of the one or more processors, the second electronic display operable to present the recorded operator from the second camera;
a first audio receiver connected to the stroller frame and communicatively coupled to at least one of the one or more processors, the first audio receiver operable to receive audio from the interior of the housing unit;
a first speaker connected to the stroller frame and communicatively coupled to at least one of the one or more processors, the first speaker operable to broadcast the received audio from the first audio receiver;
a second audio receiver connected to the stroller frame and communicatively coupled to at least one of the one or more processors, the second audio receiver operable to receive audio from the operator;
a second speaker connected to housing unit and communicatively coupled to at least one of the one or more processors, the second speaker operable to broadcast the received audio from the second audio receiver;
a step connected to the stroller frame and operable to support the weight of the operator;
a flare connected to the stroller frame and communicatively coupled to the one or more processors;
an interface communicatively coupled to at least one of the one or more processors, the interface operable to control the steering structure and receive a temperature selection from the operator;
the one or more processors operable to:
  receive a distance measurement of a distance between an operator and the distance sensor from the distance sensor;
  receive a speed measurement from the speed sensor;
  determine, based at least in part on the received distance measurement and the received speed measurement, to adjust the speed of the stroller frame by at least one from the set comprising: applying the brake, adjusting the power applied by the motor to the at least one of the wheels, and igniting the flare;
  determine that the safety line engaged the switch;
  determine to apply the brake based at least in part upon the determination that the safety line engaged the switch, the speed measurement, and a maximum deceleration rate;
  receive a temperature measurement from the temperature sensor;
  compare the temperature measurement to the temperature selection;
  based at least in part upon the comparison of the temperature measurement to the temperature selection, engage at least one of the heating element and the cooling element;
  receive the measurement from the heart rate sensor;
  present the heart rate measurement to the operator on the first electronic display;
  determine a distance traveled by the stroller frame; and
  present the determined distance traveled on the first electronic display.

2. A stroller system, comprising:
a stroller frame connected to three or more wheels;
a housing operable to accommodate a first rider;
a motor coupled to the frame and at least one of the wheels operable to apply power to the at least one of the wheels;
a brake coupled to at least one of the wheels;
one or more processors coupled to the frame;
a first electronic display coupled to the frame and communicatively coupled to at least one of the one or more processors;
a distance sensor coupled to the frame and communicatively coupled to at least one of the one or more processors, the distance sensor operable to measure a distance between the sensor and an object;
a speed sensor coupled to the frame and communicatively coupled to at least one of the one or more processors, the speed sensor operable to measure the speed of the frame;
a flare connected to the stroller frame and communicatively coupled to the one or more processors;
at least one of the one or more processors operable to:
  receive a distance measurement of a distance between an operator and the distance sensor from the distance sensor;
  receive a speed measurement from the speed sensor; and
  determine, based at least in part on the received distance measurement and the received speed measurement, to adjust the speed of the stroller frame by at least one from the set comprising: applying the brake, adjusting the power applied by the motor to the at least one of the wheels, and igniting the flare.

3. The system of claim 2, further comprising:
a switch operable to apply the brake;
a safety line coupled to the switch;
at least one of the one or more processors operable to:
determine that the safety line engaged the switch; and
determine to apply the brake based at least in part upon the determination that the safety line engaged the switch, the speed measurement, and a maximum deceleration rate.

4. The system of claim 2, further comprising:
a steering structure operable, to change a direction of movement of the stroller frame; and
an interface communicatively coupled to at least one of the one or more processors and operable to control the steering structure.

5. The system of claim 2, further comprising:
a temperature sensor coupled to the housing unit and communicatively coupled to at least one of the one or more processors, the temperature sensor operable to measure an air temperature in the housing unit;
a heating element coupled to the housing unit and communicatively coupled to at least one of the one or more processors, the heating element operable to emit hot air into the housing unit;
a cooling element coupled to the housing unit and communicatively coupled to at least one of the one or more processors, the cooling element operable to emit cool air into the housing unit;
an interface communicatively coupled to at least one of the one or more processors and operable to receive a temperature selection from an operator;
at least one of the one or more processors is further operable to:
receive a temperature measurement from the temperature sensor;
compare the temperature measurement to the temperature selection; and
based at least in part upon the comparison of the temperature measurement to the temperature selection, engage at least one of the heating element and the cooling element.

6. The system of claim 2, further comprising:
a heart rate sensor communicatively coupled to at least one of the one or more processors and operable to measure a heartbeat of an operator;
at least one of the one or more processor is further operable to:
receive the measurement from the heart rate sensor; and
present the heart rate measurement to the operator on the first electronic display.

7. The system of claim 2, at least one of the one or more processors further operable to:
determine a distance traveled by the stroller frame; and
present the determined distance traveled on the first electronic display.

8. The system of claim 2, further comprising:
a second electronic display coupled to the frame and communicatively coupled to at least one of the one or more processors;
a first camera connected to the stroller frame and communicatively coupled to at least one of the one or more processors, the first camera operable to record the interior of the housing unit;
the first electronic display operable to present the recorded interior of the housing unit from the first camera;
a second camera connected to the stroller frame and communicatively coupled to at least one of the one or more processors operable to record an operator; and
the second electronic display operable to present the recorded operator from the second camera.

9. The system of claim 2, further comprising:
a first audio receiver connected to the stroller frame and communicatively coupled to at least one of the one or more processors, the first audio receiver operable to receive audio from the interior of the housing unit;
a first speaker connected to the stroller frame and communicatively coupled to at least one of the one or more processors, the first speaker operable to broadcast the received audio from the first audio receiver;
a second audio receiver connected to the stroller frame and communicatively coupled to at least one of the one or more processors, the second audio receiver operable to receive audio from an operator; and
a second speaker connected to housing unit and communicatively coupled to at least one of the one or more processors, the second speaker operable to broadcast the received audio from the second audio receiver.

10. The system of claim 2, further comprising:
a step connected to the stroller frame and operable to support the weight of an operator.

11. The system of claim 2, further comprising:
a pressure sensor communicatively coupled to at least one of the one or more processors, the pressure sensor operable to measure pressure from the operator.

12. A stroller, comprising:
a stroller frame connected to three or more wheels;
a housing operable to accommodate a first rider;
a motor coupled to the frame and at least one of the wheels operable to apply power to the at least one of the wheels;
a brake coupled to at least one of the wheels;
one or more processors coupled to the frame;
a first electronic display coupled to the frame and communicatively coupled to at least one of the one or more processors;
a distance sensor coupled to the frame and communicatively coupled to at least one of the one or more processors;
a speed sensor coupled to the frame and communicatively coupled to at least one of the one or more processors;
a flare connected to the stroller frame and communicatively coupled to the one or more processors;
at least one of the one or more processors operable to:
receive a distance measurement of a distance between an operator and the distance sensor from the distance sensor;
receive a speed measurement from the speed sensor; and
determine, based at least in part on the received distance measurement and the received speed measurement, whether to apply the brake, adjust the speed of the stroller frame by at least one from the set comprising: applying the brake, adjusting the power applied by the motor to the at least one of the wheels, and igniting the flare.

13. The stroller of claim 12, further comprising:
a switch operable to apply the brake; and
a safety line coupled to the switch.

14. The stroller of claim 12, further comprising:
a steering structure for changing a direction of movement of the stroller frame; and
an interface communicatively coupled to at least one of the one or more processors.

15. The stroller of claim 12, further comprising:
a temperature sensor coupled to the housing unit and communicatively coupled to at least one of the one or more processors;
a heating element coupled to the housing unit and communicatively coupled to at least one of the one or more processors;
a cooling element coupled to the housing unit and communicatively coupled to at least one of the one or more processors; and
an interface communicatively coupled to at least one of the one or more processors.

16. The stroller of claim 12, further comprising:
a heart rate sensor communicatively coupled to at least one of the one or more processors.

17. The stroller of claim 12, further comprising:
a second electronic display coupled to the frame and communicatively coupled to at least one of the one or more processors;
a first camera connected to the stroller frame and communicatively coupled to at least one of the one or more processors; and
a second camera connected to the stroller frame and communicatively coupled to at least one of the one or more processors.

18. The stroller of claim 12, further comprising:
a first audio receiver connected to the stroller frame and communicatively coupled to at least one of the one or more processors;
a first speaker connected to the stroller frame and communicatively coupled to at least one of the one or more processors;
a second audio receiver connected to the stroller frame and communicatively coupled to at least one of the one or more processors; and
a second speaker connected to housing unit and communicatively coupled to at least one of the one or more processors.

19. The stroller of claim 12, further comprising:
a step connected to the stroller frame.

20. The stroller of claim 12, further comprising:
a pressure sensor communicatively coupled to at least one of the one or more processors.

* * * * *